(12) United States Patent
Aoyagi et al.

(10) Patent No.: US 11,855,517 B2
(45) Date of Patent: Dec. 26, 2023

(54) STATOR AND MOTOR

(71) Applicant: YAMADA MANUFACTURING CO., LTD., Kiryu (JP)

(72) Inventors: Rie Aoyagi, Kiryu (JP); Katuhiro Machida, Kiryu (JP); Takashi Yamazaki, Kiryu (JP); Yasuaki Motegi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 188 days.

(21) Appl. No.: 17/665,705

(22) Filed: Feb. 7, 2022

(65) Prior Publication Data

US 2022/0278583 A1    Sep. 1, 2022

(30) Foreign Application Priority Data

Feb. 26, 2021   (JP) ................. 2021-030393

(51) Int. Cl.
*H02K 3/52*     (2006.01)
*H02K 5/22*     (2006.01)
*H02K 3/50*     (2006.01)
*H02K 3/34*     (2006.01)

(52) U.S. Cl.
CPC ............ *H02K 5/225* (2013.01); *H02K 3/345* (2013.01); *H02K 3/50* (2013.01); *H02K 3/52* (2013.01); *H02K 3/522* (2013.01)

(58) Field of Classification Search
CPC ........ H02K 5/225; H02K 3/522; H02K 3/345; H02K 3/50; H02K 3/52; H02K 3/46
USPC ........................................... 310/214, 215, 71
See application file for complete search history.

(56) References Cited

U.S. PATENT DOCUMENTS

2020/0313490 A1*  10/2020  Watanabe .............. H02K 1/146

FOREIGN PATENT DOCUMENTS

JP        2020-014366       1/2020

\* cited by examiner

*Primary Examiner* — Alexander A Singh
(74) *Attorney, Agent, or Firm* — Rankin, Hill & Clark LLP

(57) ABSTRACT

A stator includes a terminal unit disposed on a first side in an axial direction with respect to a stator main body, and the terminal unit includes a base extending in an arc shape in a circumferential direction following the stator main body, a first inner side engaging portion provided on an inner circumferential edge of the base, an outer side engaging portion provided on an outer circumferential edge of the base, and an arm extending from the outer circumferential edge of the base in the radial direction and continuous with the outer side engaging portion.

8 Claims, 11 Drawing Sheets

STATOR AND MOTOR

CROSS-REFERENCE TO RELATED APPLICATION

Priority is claimed on Japanese Patent Application No. 2021-030393, filed Feb. 26, 2021, the content of which is incorporated herein by reference.

BACKGROUND OF THE INVENTION

Field of the Invention

The present invention relates to a stator and a motor.

Description of Related Art

Current is supplied from an external power supply to a coil of a motor via a control board. For example, as disclosed in Japanese Unexamined Patent Application, First Publication No. 2020-14366 (hereinafter, Patent Document 1), a drawing wiring drawn from the coil is connected to the control board via a terminal unit. Such a terminal unit includes a terminal to which the drawing wiring is connected, and a terminal block formed of a resin and configured to hold the terminal. A plate is formed in an annular shape disposed coaxially with an axis of a stator core. The terminal block is superimposed with the stator core in an axial direction.

SUMMARY OF THE INVENTION

However, in the related art described above, since the terminal block is formed to be superimposed with the stator core as a whole, there is room for improvement in terms of reduction in manufacturing costs or reduction in size.

An aspect according to the present invention is directed to providing a stator and motor capable of achieving reduction in manufacturing costs or reduction in size.

In order to solve the problems and accomplish purposes related thereto, the present invention employs the following aspects.

(1) A stator according to an aspect of the present invention includes: a stator main body having a tubular yoke and a plurality of teeth protruding inward from the yoke in a radial direction and arranged in a circumferential direction; a coil mounted on the teeth; and a terminal block disposed on a first side in the axial direction with respect to the stator main body, wherein the terminal block includes: a base extending in an arc shape in a circumferential direction while holding a terminal to which a drawing wiring drawn from the coil is connected; a first inner side engaging portion provided on an inner circumferential side of the base and engaged with a first inner side engaged portion provided on an inner circumferential side of the stator main body; an outer side engaging portion provided on an outer circumferential side of the base and engaged with an outer side engaged portion provided on an outer circumferential side of the stator main body; and an arm extending in the radial direction from a part of the base in the circumferential direction and connected to an engaging portion of one of the first inner side engaging portion and the outer side engaging portion.

According to the above-mentioned aspect (1), since the base is formed in an arc shape, for example, in comparison with the case in which the base is formed in an annular shape following the stator main body, a dimension of the terminal block in the circumferential direction can be reduced. Moreover, since the base and the one engaging portion are connected to each other via the arm, a dimension of the base in the radial direction can be reduced in comparison with the case in which the base and the one engaging portion are directly connected to each other. Accordingly, reduction in size of the terminal block is achieved, and reduction in size of the stator is easily realized. A material used for the terminal block can be reduced, and reduction in manufacturing costs can be achieved.

(2) In the above-mentioned aspect (1), the first inner side engaging portion may be engaged with the first inner side engaged portion in the axial direction and the circumferential direction, the terminal block may include a second inner side engaging portion provided to be arranged in the circumferential direction with respect to the first inner side engaging portion on an inner circumferential side of the base, and the second inner side engaging portion may be engaged with a second inner side engaged portion provided on an inner circumferential side of the stator main body in the radial direction.

According to the above-mentioned aspect (2), when the first inner side engaging portion and the second inner side engaging portion are arranged in the circumferential direction, positioning of the stator main body and the terminal block on the same circumference as the first inner side engaging portion in the radial direction can be performed. Accordingly, an inward protrusion amount of the terminal block or the stator main body in the radial direction can be minimized, and reduction in size of the stator is easily realized.

(3) In the above-mentioned aspect (2), the second inner side engaging portion may have an inclined surface extending on one side in the radial direction from a first side toward a second side in the axial direction, and the second inner side engaged portion may have an inclined surface extending on the other side in the radial direction from the first side toward the second side in the axial direction and abutting the second inner side engaging portion.

According to the above-mentioned aspect (3), when the terminal block is assembled to the stator main body, the stator main body and the terminal block approach each other in the axial direction. Here, when the second inner side engaged portion and the second inner side engaging portion slide with each other, the terminal block is guided toward the other side in the radial direction as the stator main body and the terminal block approach each other in the axial direction. Accordingly, the second inner side engaged portion and the second inner side engaging portion can be engaged with each other while positioning the terminal block with respect to the stator main body in the radial direction. As a result, assemblability of the terminal unit can be improved.

(4) In any one of the above-mentioned aspects (1) to (3), the first inner side engaging portion may be a convex portion protruding on a second side in the axial direction with respect to the base and the first inner side engaged portion may be a concave portion into which the first inner side engaging portion is fitted, the outer side engaging portion may be a convex portion protruding on the second side in the axial direction with respect to the base, and the outer side engaged portion may be a concave portion into which the outer side engaging portion is fitted.

According to the above-mentioned aspect (4), when the engaged portion is the concave portion, an increase in dimension of the stator main body in the axial direction can be minimized. Accordingly, a trajectory of a nozzle of a winding machine when a coil conductive wire is wound on the teeth can be reduced. For this reason, manufacturing efficiency of the stator can be improved.

(5) In any one of the above-mentioned aspects (1) to (4), the arm may extend from the base toward an outer side in the radial direction and may be connected to the outer side engaging portion.

According to the above-mentioned aspect (5), since the base can be disposed closer to an inner side of the outer circumferential edge of the stator main body in the radial direction, the exterior of the base is easily reduced. For this reason, a material used for the terminal block can be reduced, and reduction in manufacturing costs can be achieved.

(6) In any one of the above-mentioned aspects (1) to (5), the stator main body, the coil and the terminal block may be integrally molded by a resin material.

According to the above-mentioned aspect (6), even when reduction in size of the terminal block is achieved, the terminal block can be fixed to the stator main body at a desired position.

(7) In the above-mentioned aspect (6), a through-hole passing through the base in the axial direction may be formed in the base.

According to the above-mentioned aspect (7), when the stator main body, the terminal block, or the like is mold integrally, the through-hole can be used as a distribution channel of a resin material. Accordingly, a filling error of the resin material into the molding die can be prevented, and the stator main body, the terminal block, or the like can be accurately covered.

(8) A motor according to an aspect of the present invention includes the stator according to any one of the above-mentioned aspects (1) to (7).

According to the above-mentioned aspect (8), since the stator according to any one of the above-mentioned aspects (1) to (7) is provided, it is possible to provide the motor with a small size at a low cost.

According to the aspect of the present invention, reduction in manufacturing costs or reduction in size can be achieved.

DETAILED DESCRIPTION OF THE INVENTION

Next, an embodiment of the present invention will be described with reference to the accompanying drawings. In the embodiment, a case in which a stator and a motor according to the present invention are employed in an electric water pump (hereinafter referred to as EWP) will be exemplarily described. In an embodiment or a variant described below, the same reference signs designate corresponding configurations and description thereof may be omitted. In the following description, for example, expressions indicating relative or absolute arrangement such as "parallel," "perpendicular," "central," "coaxial," and the like shall express not only such arrangements strictly, but also a state of being relatively displaced with an angle or a distance to the extent that tolerance or the same function can be obtained.

[EWP 1]

Figure 1:
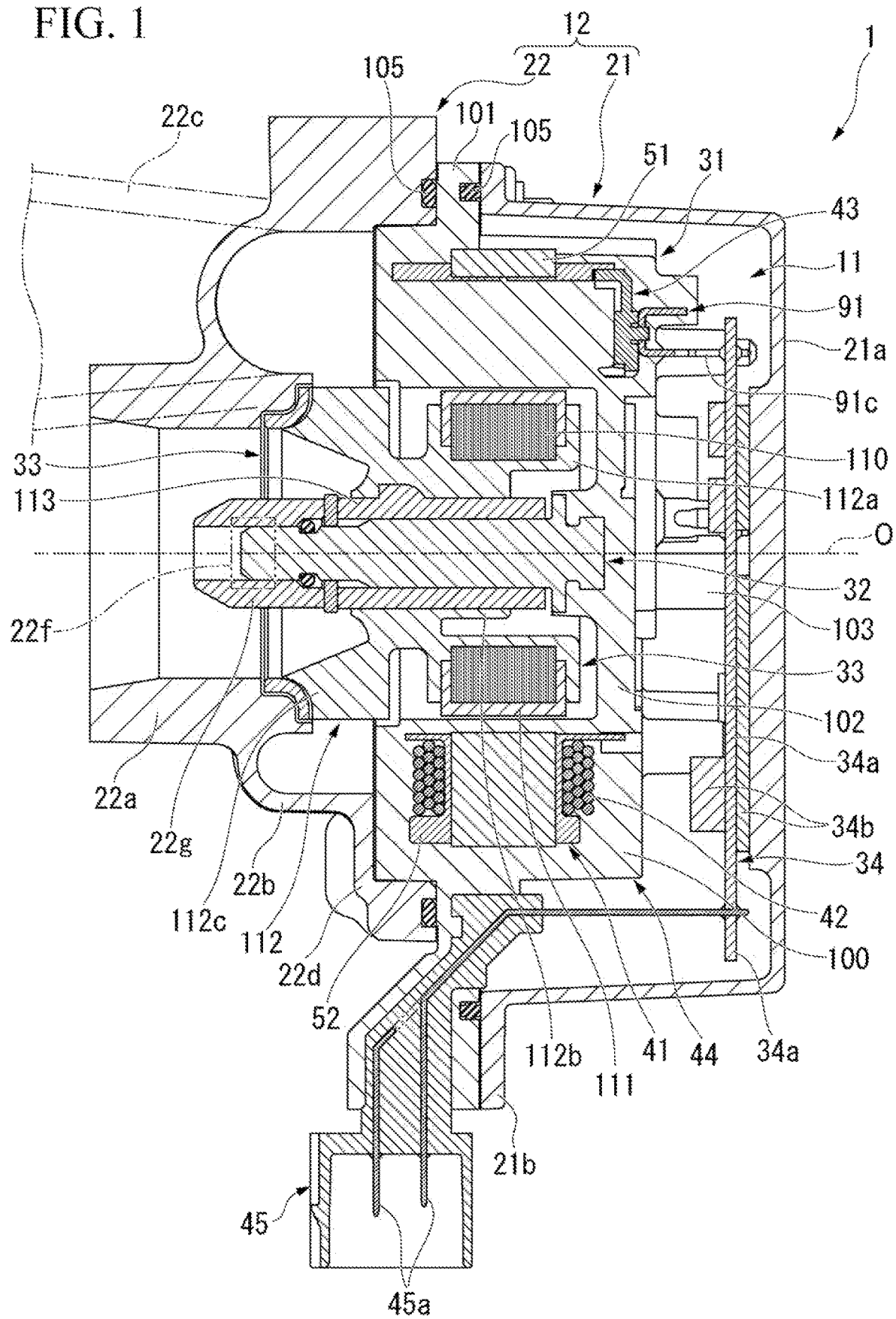
FIG. 1 is a cross-sectional view of an electric water pump according to an embodiment.

FIG. 1 is a cross-sectional view of an EWP 1.

The EWP 1 shown in FIG. 1 is mounted on, for example, a vehicle or the like. The EWP 1 is provided on a cooling water channel that connects at least an engine and a radiator, and distributes cooling water between the engine and the radiator. The vehicle may be a hybrid vehicle, a plug-in hybrid vehicle, or the like in addition to the vehicle having the engine only.

The EWP 1 includes a pump part (a motor) 11 and a housing 12.

The pump part 11 is, for example, an inner rotor type brushless motor. The pump part 11 is accommodated in the housing 12. In the following description, a direction along an axis O of the pump part 11 (a shaft 32 described below) may be simply referred to as an axial direction, a direction that crosses the axis O when seen from the axial direction may be referred to as a radial direction, and a direction around the axis O may be referred to as a circumferential direction.

<Housing 12>

The housing 12 accommodates the pump part 11, and also forms a part of a cooling water channel. The housing 12 includes a pump cover 21 and a channel block 22.

The pump cover 21 covers the pump part 11 from a first side of the pump part 11 in the axial direction. The pump cover 21 includes a pump accommodating section 21a and an attachment flange section 21b. The pump accommodating section 21a is formed in a bottomed tubular shape that opens toward a second side in the axial direction. The pump part 11 is accommodated inside the pump accommodating section 21a. The attachment flange section 21b overhangs toward an outer side in the radial direction from an opening edge of the pump accommodating section 21a (a second side edge in the axial direction).

The channel block 22 is superimposed with the pump cover 21 from the second side in the axial direction with the pump part 11 sandwiched therebetween. The channel block 22 includes a suction channel 22a, an ejection channel 22b, a connecting port 22c, and an attachment flange section 22d.

The suction channel 22a is formed in a tubular shape disposed coaxially with the axis O. The suction channel 22a is connected to a portion of a cooling water channel located upstream from the EWP 1. Spokes 22f are formed on an inner circumferential surface of the suction channel 22a. The spokes 22f protrude on, for example, the inner circumferential surface of the suction channel 22a from positions facing each other in the radial direction toward an inner side in the radial direction. A hub 22g is provided on inner side end portions of the spokes 22*f* in the radial direction. The hub 22*g* is formed in a tubular shape disposed coaxially with the axis O. The hub 22*g* is supported on the axis O by the spokes 22*f* inside the suction channel 22*a*.

The ejection channel 22*b* surrounds the suction channel 22*a*. Specifically, the ejection channel 22*b* has a channel cross-sectional area that is enlarged from one side end portion toward the other side end portion in the circumferential direction. The connecting port 22*c* is connected to the other side end portion of the ejection channel 22*b* in the circumferential direction. The connecting port 22*c* extends away from the pump cover 21. The connecting port 22*c* is connected to a portion of the cooling water channel located downstream from the EWP 1.

The attachment flange section 22*d* overhangs outward from an outer circumferential edge of the ejection channel 22*b* in the radial direction. The pump cover 21 and the channel block 22 are assembled in the axial direction by fastening the attachment flange sections 21*b* and 22*d* using bolts or the like.

<Pump Part 11>

Figure 2:
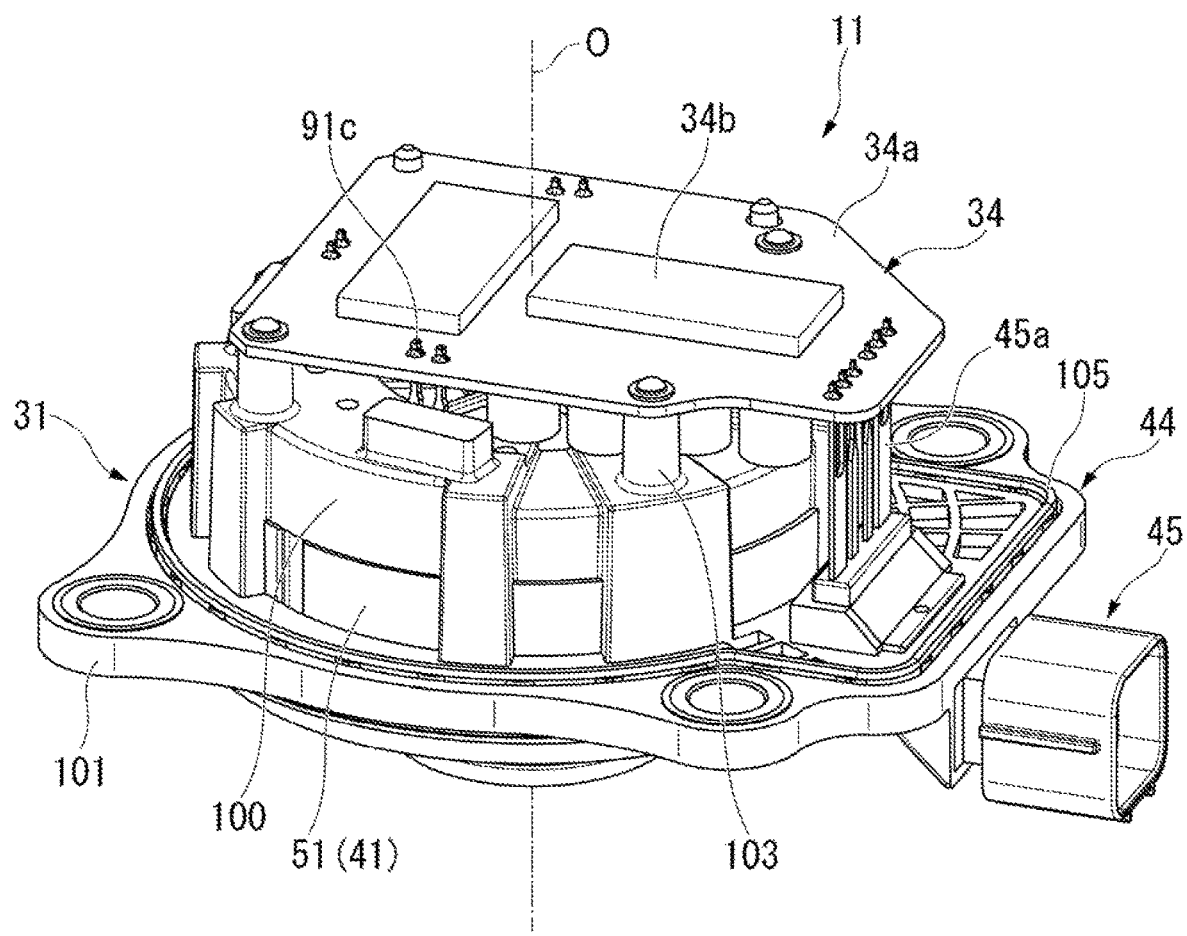
FIG. 2 is a perspective view of a pump part according to the embodiment.

FIG. 2 is a perspective view of the pump part 11.

As shown in FIG. 1 and FIG. 2, the pump part 11 includes a stator 31, the shaft 32, a rotor 33, and a control board 34.

The stator 31 is integrally assembled to the housing 12. The stator 31 includes a stator main body 41, a coil 42, a terminal unit 43, a stator mold portion 44, and a connector tray 45.

<Stator Main Body 41>

Figure 3:
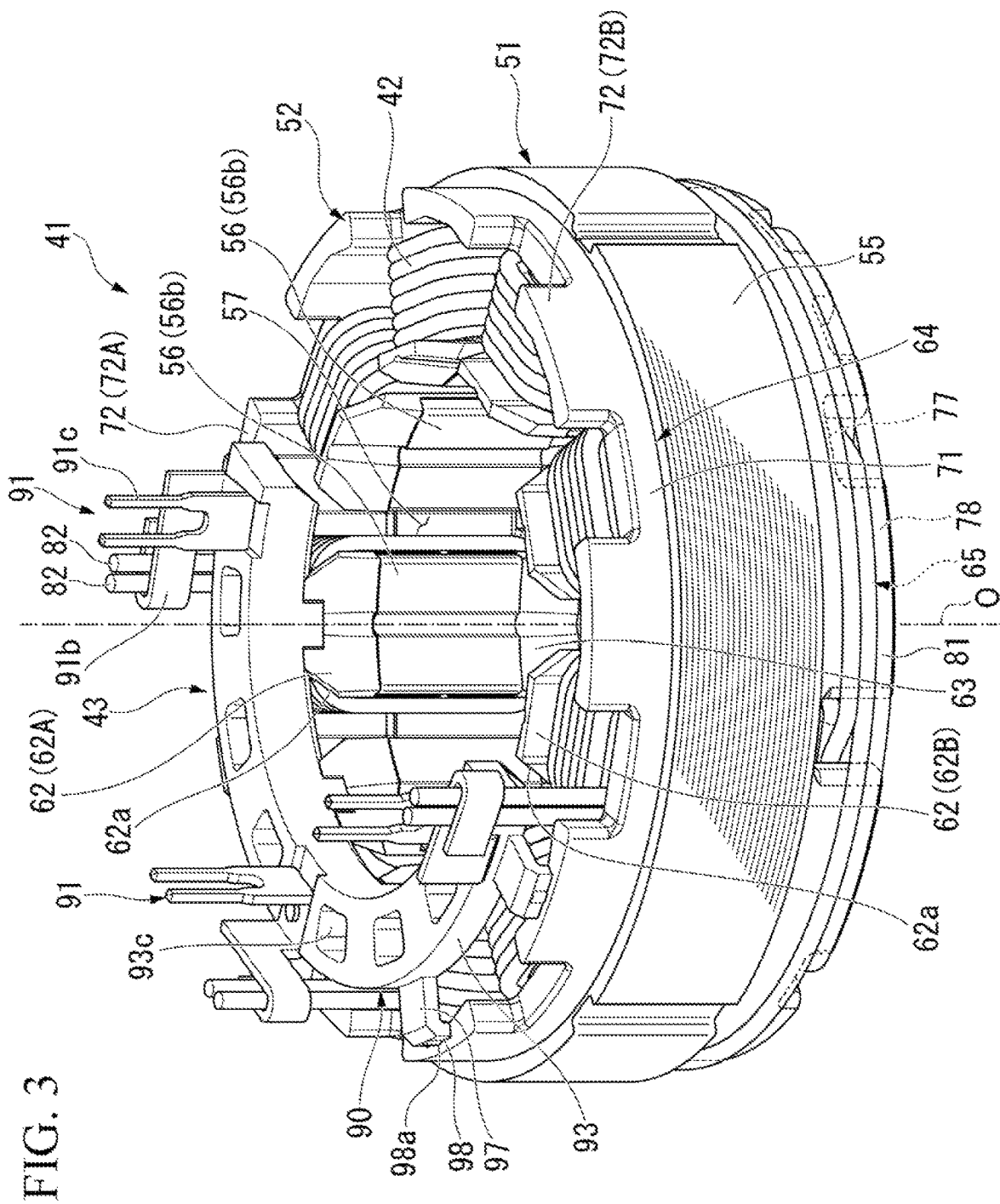
FIG. 3 is a perspective view of a stator according to the embodiment.
Figure 4:
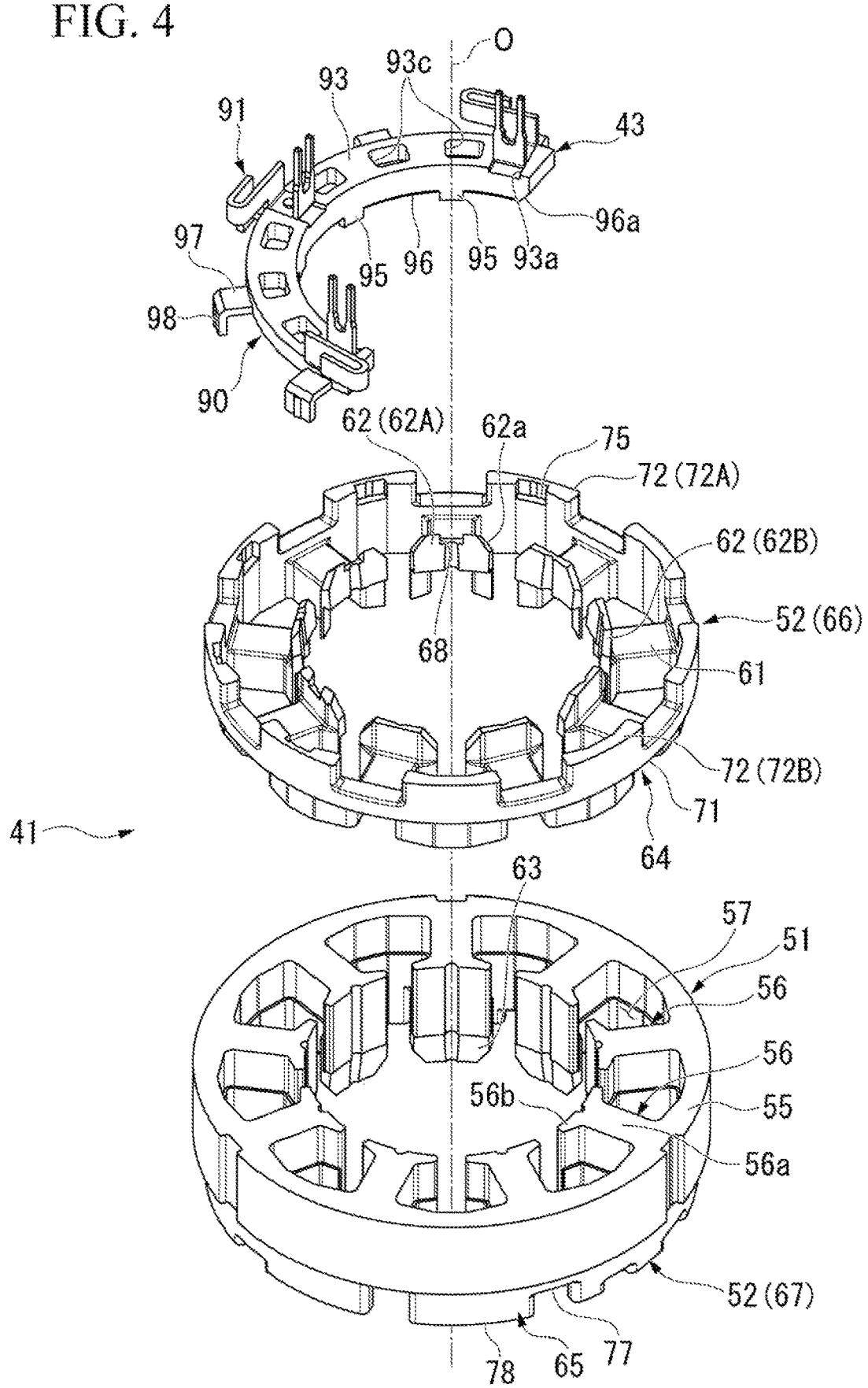
FIG. 4 is an exploded perspective view of the stator according to the embodiment.

FIG. 3 is a perspective view of the stator 31. FIG. 4 is an exploded perspective view of the stator 31. As shown in FIG. 1, FIG. 3 and FIG. 4, the stator main body 41 includes a stator core 51 and an insulator 52.

The stator core 51 is formed in a tubular shape disposed coaxially with the axis O. The stator core 51 is configured by stacking annular plates formed by punching or the like with respect to an electromagnetic steel plate in the axial direction. The stator core 51 may be a so-called pressed powder core, split cores, or the like.

As shown in FIG. 3 and FIG. 4, the stator core 51 has a yoke 55 and a plurality of teeth 56.

The yoke 55 is formed in a tubular shape disposed coaxially with the axis O.

The teeth 56 protrude inward from the inner circumferential surface of the yoke 55 in the radial direction. Each of the teeth 56 is formed in a T shape when seen in a plan view in the axial direction. Specifically, each of the teeth 56 includes a winding drum portion 56*a* extending in the radial direction, and extension portions 56*b* continuous with a tip portion of the winding drum portion 56*a* (an inner side end portion in the radial direction) and enlarged at both sides of the winding drum portion 56*a* in the circumferential direction. The plurality of teeth 56 are formed at intervals in the circumferential direction. Slots 57 are formed between the teeth 56 neighboring in the circumferential direction. The slots 57 pass through the stator core 51 in the axial direction.

The insulator 52 insulates a space between the stator core 51 and the coil 42 mounted on the stator core 51. Specifically, the insulator 52 includes coil winding portions 61, first inner side protrusion walls 62, second inner side protrusion walls 63, a first outer side guide 64, and a second outer side guide 65. As shown in FIG. 4, the insulator 52 is configured to be split into a first bobbin 66 mounted on the stator core 51 from a first side in the axial direction, and a second bobbin 67 mounted on the stator core 51 from a second side in the axial direction. However, the insulator 52 may be formed integrally with the stator core 51 through insert molding or the like.

The coil winding portions 61 surround the winding drum portion 56*a*. That is, the coil winding portions 61 cover an outer circumferential surface of the winding drum portion 56*a* (a surface directed in the axial direction, and a surface directed in the circumferential direction).

The first inner side protrusion walls 62 are continuous with the coil winding portions 61 on an inner side in the radial direction. The first inner side protrusion walls 62 cover the extension portions 56*b* from the first side in the axial direction. The first inner side protrusion walls 62 protrude from the coil winding portions 61 toward the first side in the axial direction. Inclined portions 62*a* extending toward each other in the circumferential direction toward the first side in the axial direction are formed at side edges disposed at both sides of the first inner side protrusion walls 62 in the circumferential direction. Accordingly, first side end portions of the first inner side protrusion walls 62 in the axial direction have a dimension in the circumferential direction that is gradually reduced toward the first side in the axial direction when seen in the radial direction.

Here, in the plurality of first inner side protrusion walls 62, some of the first inner side protrusion walls 62 arranged to be continuous with each other are double use inner side protrusion walls 62A, and the remaining first inner side protrusion walls 62 are single use inner side protrusion walls 62B. In the embodiment, among the nine first inner side protrusion walls 62, the four first inner side protrusion walls 62 arranged in the circumferential direction constitute the double use inner side protrusion walls 62A, and the remaining five first inner side protrusion walls 62 constitute the single use inner side protrusion walls 62B. However, the number of the single use inner side protrusion walls 62B can be arbitrarily set as long as the first inner side protrusion walls 62 have at least one of the double use inner side protrusion walls 62A. For example, the single use inner side protrusion walls 62B may not be provided.

Figure 5:
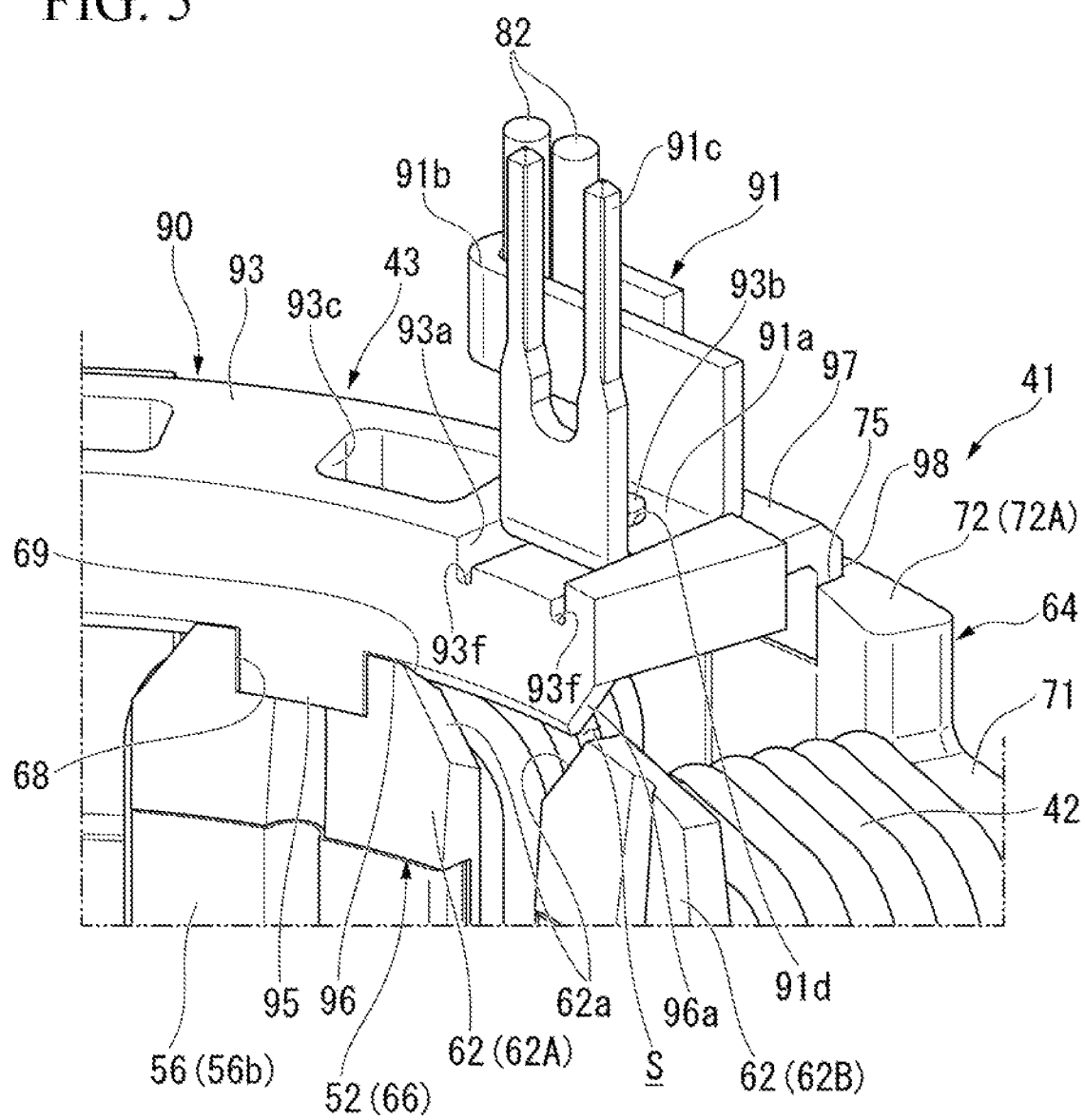
FIG. 5 is an enlarged perspective view of the stator according to the embodiment.
Figure 6:
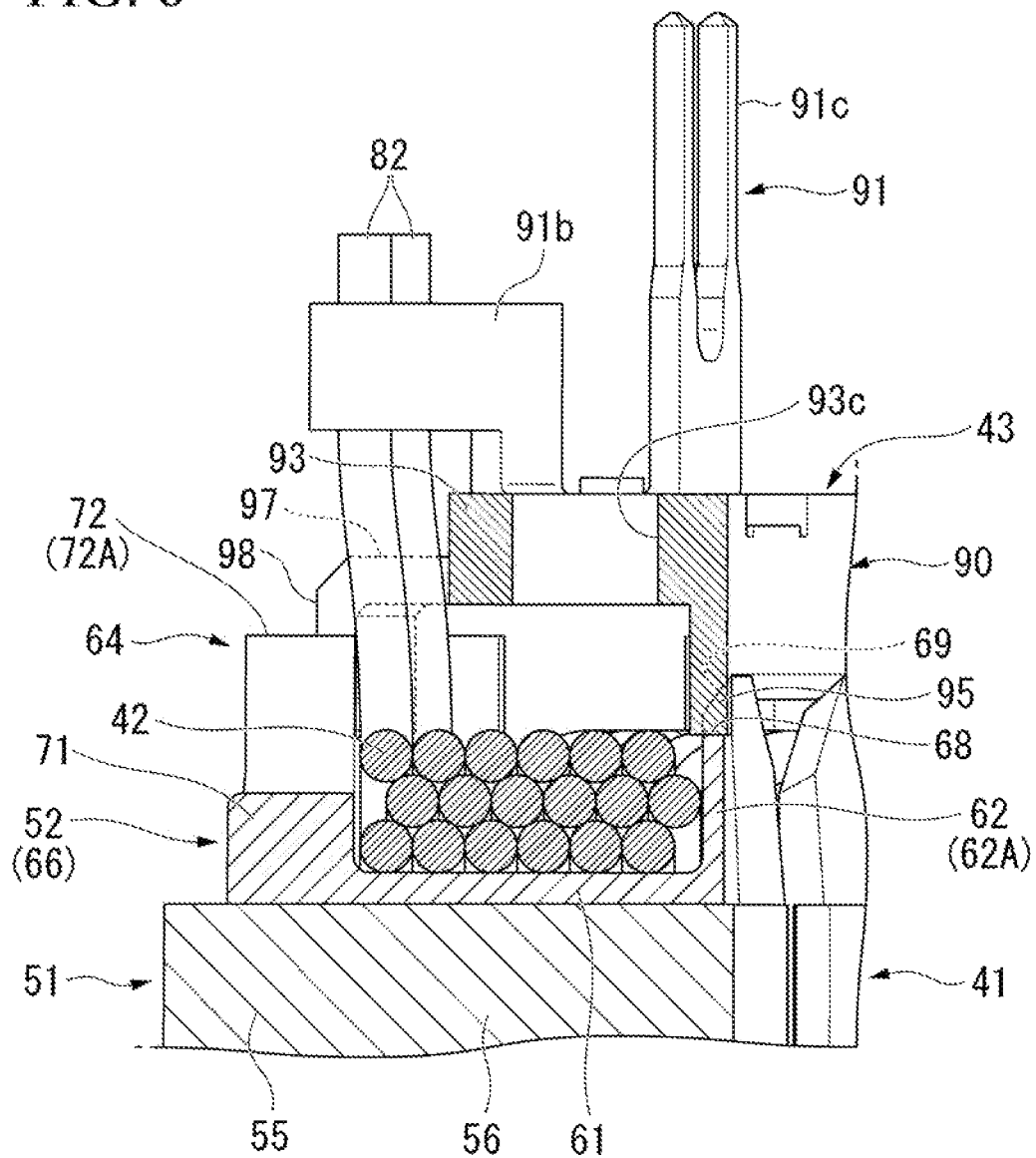
FIG. 6 is a cross-sectional view corresponding to line VI-VI of FIG. 9.

FIG. 5 is an enlarged perspective view of the stator 31. FIG. 6 is a cross-sectional view corresponding to line VI-VI of FIG. 9.

As shown in FIG. 5 and FIG. 6, first inner side engaged portions 68 and second inner side engaged portions 69 are formed on the double use inner side protrusion walls 62A.

The first inner side engaged portions 68 are concave portions recessed in central portions of the double use inner side protrusion walls 62A in the circumferential direction with respect to a first side edge in the axial direction. Each of the first inner side engaged portions 68 is formed in a rectangular shape when seen in the radial direction. The first inner side engaged portions 68 pass through the double use inner side protrusion walls 62A in the radial direction.

Figure 7:
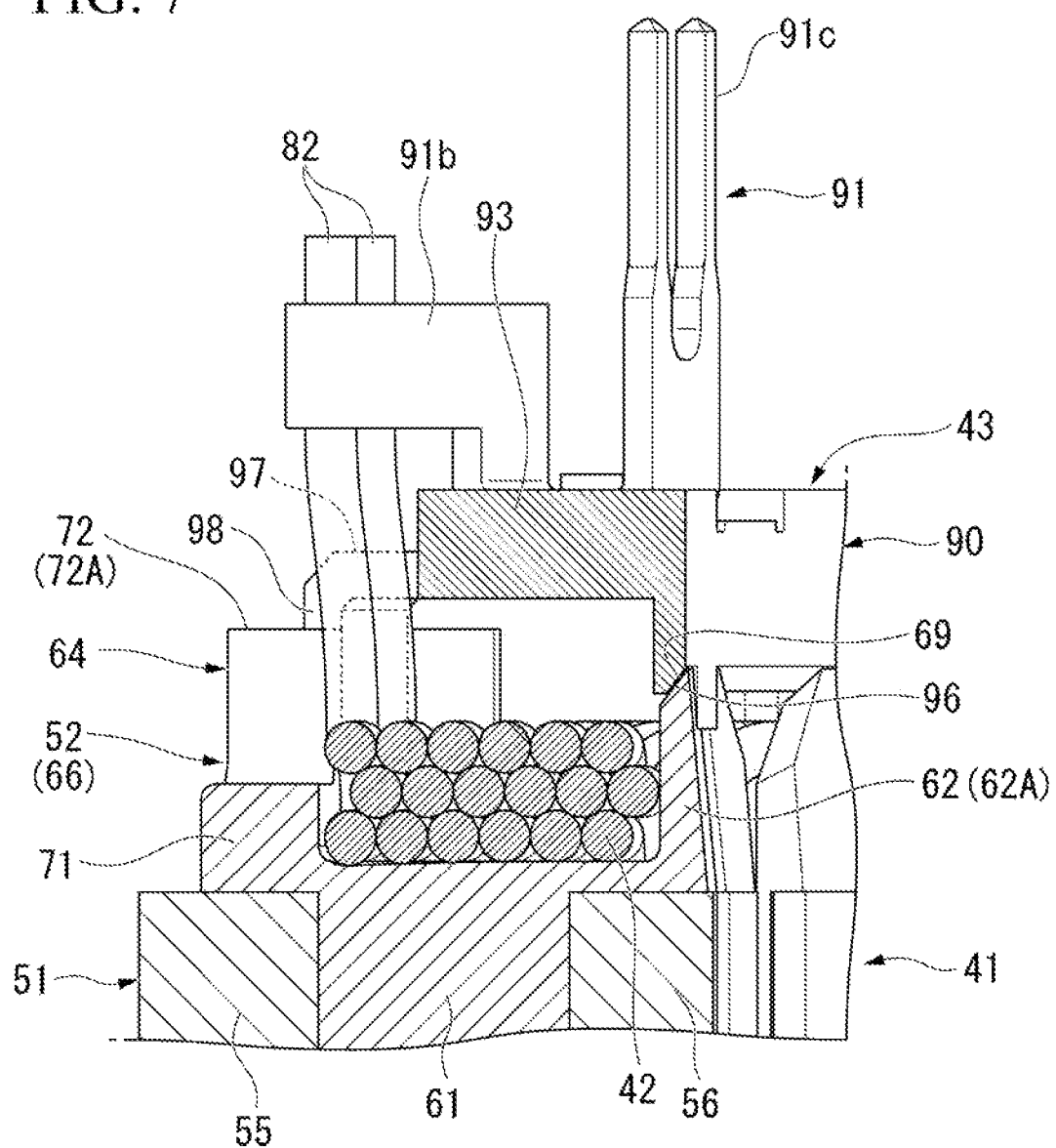
FIG. 7 is a cross-sectional view corresponding to line VII-VII of FIG. 9.
Figure 9:
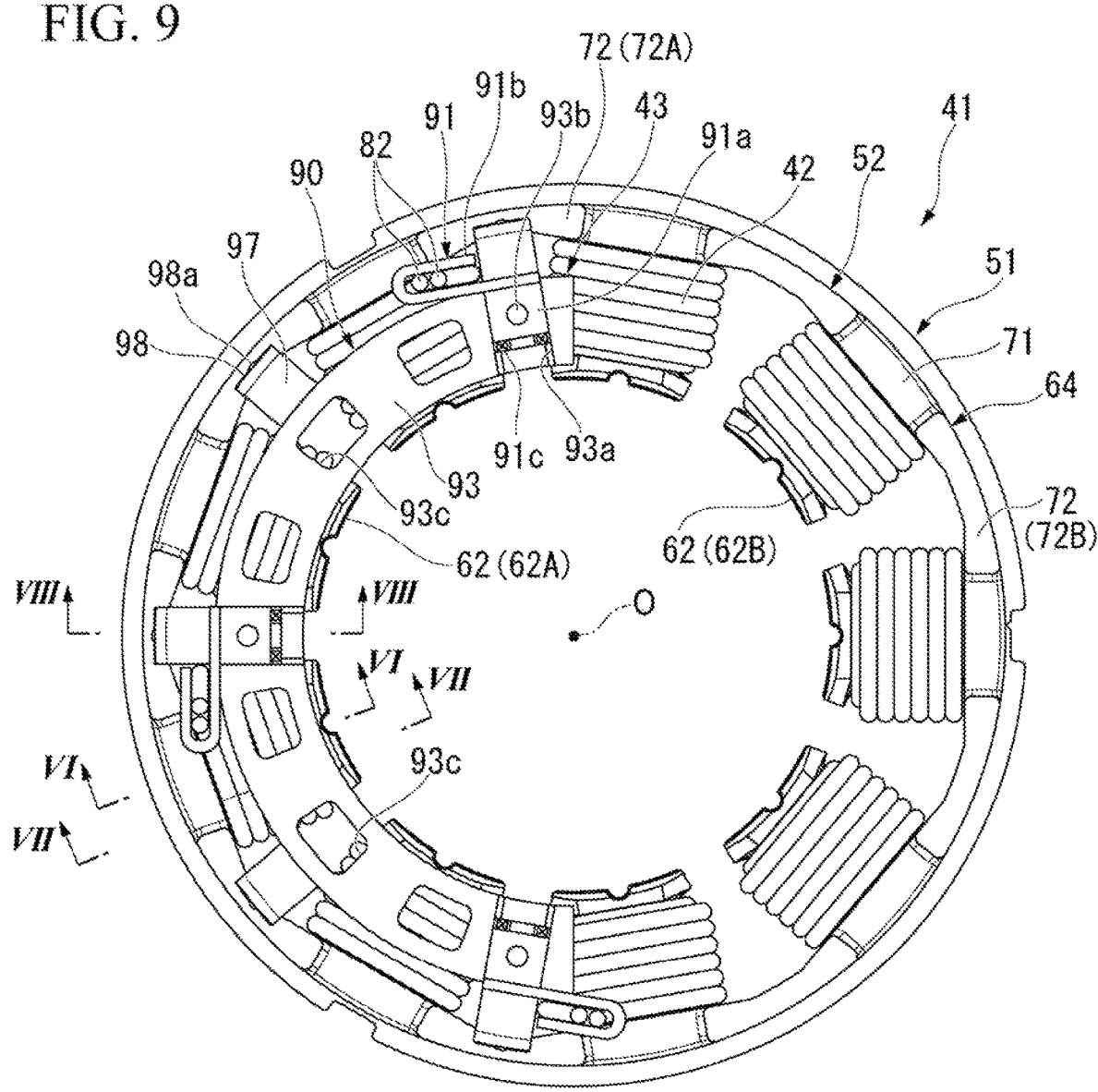
FIG. 9 is a plan view of the stator according to the embodiment.

FIG. 7 is a cross-sectional view corresponding to line VII-VII of FIG. 9.

As shown in FIG. 5 and FIG. 7, the second inner side engaged portions 69 are formed in portions of the double use inner side protrusion walls 62A disposed at both sides of the first inner side engaged portions 68 in the circumferential direction. The outer circumferential surfaces of the second inner side engaged portions 69 are formed on inclined surfaces of the double use inner side protrusion walls 62A extending toward the outer side in the radial direction as the first side end portion in the axial direction is directed from the first side to the second side in the axial direction.

As shown in FIG. 3 and FIG. 4, the second inner side protrusion walls 63 cover the extension portions 56*b* from the second side in the axial direction. The second inner side protrusion walls 63 protrude on the second side in the axial direction with respect to the coil winding portions 61.

The first outer side guide 64 includes a ring portion 71 and outer side protrusion walls 72.

The ring portion 71 is disposed coaxially with the axis O. The ring portion 71 covers at least a portion of the yoke 55 located on an inner circumferential side from the first side in the axial direction. Outer side edges of the coil winding portions 61 in the radial direction are continuous with the inner circumferential edge of the ring portion 71. The ring portion 71 protrudes on the first side in the axial direction with respect to the coil winding portions 61.

The outer side protrusion walls 72 are formed at positions of the ring portion 71 corresponding to the slots 57 in the circumferential direction. The outer side protrusion walls 72 protrude from the ring portion 71 toward the first side in the axial direction. When seen in the radial direction, both end portions of the outer side protrusion walls 72 in the circumferential direction are superimposed with facing end portions of the neighboring first inner side protrusion walls 62 in the circumferential direction.

Here, among the plurality of outer side protrusion walls 72, some of the outer side protrusion walls 72 arranged to be continuous with each other are the double use outer side protrusion walls 72A, and the remaining outer side protrusion walls 72 are the single use outer side protrusion walls 72B. In the embodiment, among the nine outer side protrusion walls 72, the five outer side protrusion walls 72 disposed on both sides of the double use inner side protrusion walls 62A in the circumferential direction constitute the double use outer side protrusion walls 72A, and the remaining four outer side protrusion walls 72 constitute the single use outer side protrusion walls 72B. The number of the single use outer side protrusion walls 72B can be arbitrarily set as long as the outer side protrusion walls 72 have at least one of the double use outer side protrusion walls 72A. For example, the single use outer side protrusion walls 72B may not be provided.

Figure 8:
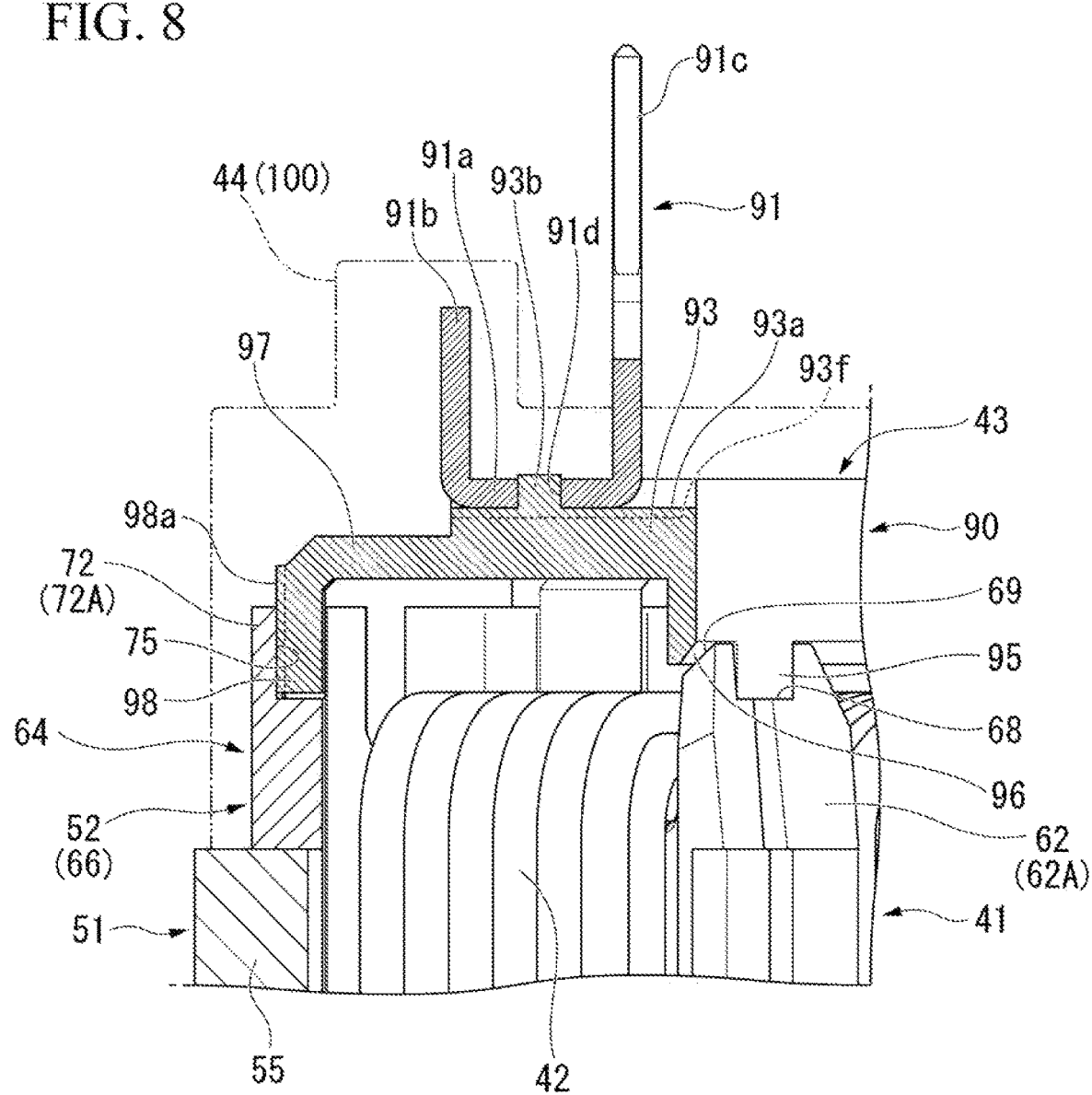
FIG. 8 is a cross-sectional view corresponding to line VIII-VIII of FIG. 9.

FIG. 8 is a cross-sectional view corresponding to line VIII-VIII of FIG. 9.

As shown in FIG. 5 and FIG. 8, outer side engaged portions 75 are formed on the double use outer side protrusion walls 72A. The outer side engaged portions 75 are concave portions in which central portions of the double use outer side protrusion walls 72A in the circumferential direction are open on an inner side in the radial direction and the first side in the axial direction.

As shown in FIG. 3 and FIG. 4, the second outer side guide 65 includes a ring portion 77, and outer side protrusion walls 78.

The ring portion 77 is formed in a shape symmetrical to the ring portion 71 of the first outer side guide 64 in the axial direction. Accordingly, the ring portion 77 covers at least a portion of the yoke 55 located on the inner circumferential side from the second side in the axial direction.

The outer side protrusion walls 78 are formed at positions of the ring portion 77 corresponding to the slots 57 in the circumferential direction. The outer side protrusion walls 78 protrude from the ring portion 77 toward the second side in the axial direction.

As shown in FIG. 3, the coil 42 is configured by winding coil conductive wires of three phases of a U phase, a V phase and a W phase on the teeth 56 (the winding drum portion 56a) for the respective phases via the insulator 52 (the coil winding portions 61). Portions of the coil conductive wires disposed between the coils 42 of the same phase constitute a crossing portion 81. The crossing portion 81 connects the coils 42 of the same phase. The crossing portion 81 is guided along the outer circumferential surface of the outer side protrusion wall 78 in the circumferential direction with respect to the stator core 51 on the second side in the axial direction.

Meanwhile, both end portions of the coil conductive wire of each phase constitute drawing wirings 82. Each of the drawing wirings 82 is drawn on the first side in the axial direction with respect to the stator core 51 through each of the slots 57.

<Terminal Unit 43>

As shown in FIG. 4, the terminal unit 43 is disposed on the first side in the axial direction with respect to the stator main body 41. The terminal unit 43 electrically connects the coil 42 and the control board 34. The terminal unit 43 includes a terminal block 90 and a terminal 91.

The terminal block 90 is integrally formed of a resin material or the like. The terminal block 90 is assembled to the stator main body 41 from the first side in the axial direction. The terminal block 90 includes a base 93, a first inner side engaging portion 95, a second inner side engaging portion 96, an arm 97, and an outer side engaging portion 98.

FIG. 9 is a plan view of the stator 31.

As shown in FIG. 4 and FIG. 9, the base 93 is formed in an arc shape about the axis O when seen in the axial direction. Specifically, a dimension of the base 93 in the circumferential direction is formed to about 180° at a central angle about the axis O. However, a dimension of the base 93 in the circumferential direction can be set to an arbitrary dimension as long as it is not formed in the annular shape.

The base 93 is formed to have a uniform exterior dimension in the radial direction throughout the circumferential direction. An exterior dimension of the base 93 in the radial direction is smaller than a maximum dimension of the stator main body 41 (a dimension from an outer circumferential surface of the yoke 55 to an inner circumferential surface of the extension portion 56b). Specifically, an inner circumferential edge of the base 93 is disposed at the same position as the inner circumferential surface of the extension portion 56b. Meanwhile, an outer circumferential edge of the base 93 is disposed on an inner side of the outer circumferential surface of the yoke 55 in the radial direction. There is no need to dispose the base 93 coaxially with the axis O as long as the base 93 is disposed to extend in the circumferential direction at a position superimposed with the stator main body 41 when seen in the axial direction.

As shown in FIG. 5 and FIG. 8, a plurality of terminal accommodating portions 93a are formed in the base 93. The terminal accommodating portions 93a are formed in both end portions and a central portion of the base 93 in the circumferential direction (see FIG. 9). In the embodiment, the terminal accommodating portions 93a are disposed to overlap the slots 57 when seen in the axial direction. However, the terminal accommodating portions 93a may be disposed at positions overlapping the teeth 56 when seen in the axial direction. The terminal accommodating portions 93a extend on a surface of the base 93 in the radial direction while being opened on the surface of the base 93 (a surface directed toward the first side in the axial direction).

In the base 93, holding protrusions 93b are formed on bottom surfaces of the terminal accommodating portions 93a. The holding protrusions 93b protrude from bottom surfaces of the terminal accommodating portions 93a toward the first side in the axial direction.

In the bottom surfaces of the terminal accommodating portions 93a, burr accommodating grooves 93f are formed on both edges in the circumferential direction. The burr accommodating grooves 93f open on the bottom surfaces of the terminal accommodating portions 93a and extend in the radial direction.

A plurality of through-holes 93c are formed in portions of the base 93 disposed between the neighboring terminal accommodating portions 93a. The through-holes 93c pass through the base 93 in the axial direction and are arranged at intervals in the circumferential direction. In the embodiment, among the through-holes 93c, some of the through-holes 93c are superimposed with the slots 57 when seen in the axial direction. However, all of the through-holes 93c may be superimposed with the slots 57 or may be superimposed with the teeth 56 when seen in the axial direction.

As shown in FIG. 5 and FIG. 6, the first inner side engaging portions 95 are formed at positions of the inner circumferential edge of the base 93 corresponding to the double use inner side protrusion walls 62A in the circumferential direction, respectively. The first inner side engaging portion 95 is a convex portion protruding downward from the inner circumferential edge of the base 93. The first inner side engaging portion 95 is fitted into the first inner side engaged portion 68. Movement of the terminal unit 43 toward the second side in the axial direction or both sides in the circumferential direction with respect to the stator main body 41 is restricted by abutting (engaging) the outer surface of the first inner side engaging portion 95 and the inner surface of the first inner side engaged portions 68 with each other.

As shown in FIG. 5 and FIG. 8, the second inner side engaging portion 96 is formed in a region of the inner circumferential edge of the base 93 other than the first inner side engaging portion 95. The second inner side engaging portion 96 is a convex portion protruding downward from the base 93. In the embodiment, the second inner side engaging portion 96 extends above the inner circumferential edge of the base 93 in the circumferential direction. The inner circumferential surface of the second inner side engaging portion 96 is formed on an inclined surface extending from an inner side (the other side) toward an outer side (one side) in the radial direction as it goes from the first side toward the second side in the axial direction. Movement of the terminal unit 43 toward an inner side in the radial direction with respect to the stator main body 41 is restricted as the second inner side engaging portion 96 abuts (is engaged with) the second inner side engaged portions 69 from the outer side in the radial direction. The second inner side engaging portion 96 may be formed at only a position superimposed with the second inner side engaged portions 69 when seen in the radial direction.

As shown in FIG. 5, clearance portions 96a are formed on both edges of the second inner side engaging portion 96 in the circumferential direction. The clearance portions 96a are formed on the inclined surfaces extending following the inclined portions 62a of the first inner side protrusion walls 62. The clearance portions 96a are disposed between the clearance portions 96a and the inclined portions 62a with a gap S.

As shown in FIG. 5 and FIG. 8, the arm 97 is formed on a portion of the outer circumferential edge of the base 93 facing the double use outer side protrusion walls 72A in the radial direction. The arm 97 extends from an outer circumferential edge of the base 93 toward an outer side in the radial direction like a cantilever.

The outer side engaging portion 98 extends from a tip portion of the arm 97 (an outer side end portion in the radial direction) toward the second side in the axial direction. The outer side engaging portion 98 is fitted into the outer side engaged portion 75. Movement of the terminal unit 43 to the second side in the axial direction of the terminal unit 43, both sides in the circumferential direction or the outer side in the radial direction with respect to the stator main body 41 is restricted as the outer surface of the outer side engaging portion 98 abuts (is engaged with) the inner surface of the outer side engaged portion 75. In the embodiment, a protrusion 98a is formed on the outer circumferential surface of the outer side engaging portion 98. The protrusion 98a protrudes from the outer circumferential surface of the outer side engaging portion 98 toward the outer side in the radial direction and extends in the axial direction. The protrusion 98a is pressed against the inner circumferential surface of the outer side engaged portion 75 in a state in which the outer side engaging portion 98 is fitted into the outer side engaged portion 75. That is, the outer circumferential surface of the outer side engaging portion 98 abuts the inner circumferential surface of the outer side engaged portion 75 via the protrusion 98a.

The terminal unit 43 is attached to the stator main body 41 from the first side in the axial direction, and thus, the first inner side engaged portions 68 and the first inner side engaging portion 95 are engaged with each other, the second inner side engaged portions 69 and the second inner side engaging portion 96 are engaged with each other, and the outer side engaged portions 75 and the outer side engaging portion 98 are engaged with each other. Specifically, as the stator main body 41 and the terminal unit 43 approach each other in the axial direction, the first inner side engaging portion 95 is fitted into the first inner side engaged portions 68, and the outer side engaging portion 98 is fitted into the outer side engaged portions 75. Here, when the inner circumferential surface of the second inner side engaging portion 96 slides on the outer circumferential surface of the second inner side engaged portion 69, the terminal unit 43 approaches the stator main body 41, and thus, the terminal block 90 is guided toward the outer side in the radial direction. As a result, the terminal unit 43 is positioned on the stator main body 41.

In a state in which the terminal block 90 is assembled to the stator main body 41, the second inner side engaging portion 96 and the second inner side engaged portions 69 are engaged with each other, the outer side engaging portion 98 and the outer side engaged portions 75 are engaged with each other in the radial direction, and thus, it is preferable that the arm 97 has a compressive load applied in the radial direction. Accordingly, a biasing force that presses the second inner side engaged portion 69 against the inner side in the radial direction is applied to the second inner side engaging portion 96, and a biasing force that presses and the outer side engaging portion 98 against the outer side in the radial direction is applied to the outer side engaged portion 75. As a result, the terminal unit 43 is more strongly positioned on the stator main body 41.

The terminal 91 is formed by, for example, pressing a plate member formed of a metal or the like having conductivity. The terminal 91 includes a fixed piece 91a, a coil connecting portion 91b, and a board connecting portion 91c.

The fixed piece 91a extends in the radial direction while the axial direction is a thickness direction. An assembling hole 91d passing through the fixed piece 91a in the axial direction is formed in the fixed piece 91a. The fixed piece 91a is accommodated in the terminal accommodating portion 93a in a state in which the holding protrusion 93b is press-fitted in the assembling hole 91d. The fixed piece 91a is supported on the bottom surface of the terminal accommodating portion 93a while being accommodated in the terminal accommodating portion 93a. Here, burrs or the like generated on a side edge of the fixed piece 91a are accommodated in the burr accommodating grooves 93f. A method of fixing the fixed piece 91a and the terminal block 90 may be, for example, adhesion, locking by claws and the like, or the like.

The coil connecting portion 91b is continuous with the outer circumferential edge of the fixed piece 91a. The coil connecting portion 91b extends in the circumferential direction while the radial direction is a thickness direction. The coil connecting portion 91b sandwiches the drawing wirings 82 by bending tip portions thereof. The drawing wirings 82 are connected to the coil connecting portion 91b through welding or the like.

The board connecting portion 91c extends from the inner circumferential edge of the fixed piece 91a toward the first side in the axial direction.

<Stator Mold Portion 44>

As shown in FIG. 1 and FIG. 2, the stator mold portion 44 is formed by molding a resin material in a state in which the stator main body 41, the coil 42 and the terminal unit 43 are assembled. The stator mold portion 44 includes a covering portion 100, an attachment piece 101, a shaft support wall 102, and a spacer portion 103.

The covering portion 100 is formed in a tubular shape extending coaxially with the axis O. The covering portion 100 covers the stator main body 41, the coil 42 and the terminal unit 43 integrally. A part of the outer circumferential surface of the stator core 51 and the board connecting portion 91c are exposed to the outside from the covering portion 100. The board connecting portion 91c protrudes from the covering portion 100 toward the first side in the axial direction.

The attachment piece 101 overhangs from the second side end portion of the covering portion 100 in the axial direction toward the outer side in the radial direction. The attachment piece 101 is fastened to the attachment flange sections 21b and 22d together while being sandwiched between the attachment flange sections 21b and 22d of the pump cover 21 and the channel block 22. Packings 105 are provided between the attachment piece 101 and the attachment flange section 21b of the pump cover 21 and between the attachment piece 101 and the attachment flange section 22d of the channel block 22. Accordingly, a space between the pump cover 21 and the channel block 22 is sealed.

The shaft support wall 102 closes the first side opening portion of the covering portion 100 in the axial direction. The spacer portion 103 protrudes from the covering portion 100 toward the first side in the axial direction. The plurality of spacer portions 103 are provided at intervals in the circumferential direction.

The stator mold portion 44 is formed by filling a resin material from the second side in the axial direction in a state in which the stator main body 41, the coil 42 and the terminal unit 43 are set in a molding die. That is, the resin material filled in the molding die wraps around the terminal unit 43 through the slots 57, the through-holes 93c, the gap S, and the like.

The connector tray 45 is buried in a part of the attachment piece 101. An opening portion of the connector tray 45 is opened outside the housing 12. Tip portions of a plurality of connector pins 45a are exposed in the opening portion of the connector tray 45. Base end portions of the connector pins 45a extends in the housing 12 around the covering portion 100 toward the first side in the axial direction.

As shown in FIG. 1, the shaft 32 passes through the stator main body 41 in the axial direction. A first side end portion of the shaft 32 in the axial direction is molded integrally with the shaft support wall 102. A second side end portion of the shaft 32 in the axial direction is supported by the hub 22g of the channel block 22.

<Rotor 33>

The rotor 33 is rotatably supported by the shaft 32 inside the stator core 51. The rotor 33 includes a rotor core 110, a plurality of magnets (not shown), a magnet cover 111, a rotor mold portion 112, and a bush 113.

The rotor core 110 is formed in a tubular shape disposed coaxially with the axis O. The rotor core 110 is configured by stacking annular plates formed by punching or the like electromagnetic steel plates in the axial direction.

Magnets are provided on the outer circumferential surface of the rotor core 110 and arranged in the circumferential direction. The magnets are disposed such that magnetic poles directed in the radial direction are different between the magnets neighboring in the circumferential direction. However, annular plastic magnets or the like formed through injection molding or the like may be used as the magnets.

The magnet cover 111 is mounted from an outer side of the rotor core 110 in the radial direction. The magnet cover 111 covers the magnets from an outer side in the radial direction and both sides in the axial direction. That is, the magnets face the stator core 51 in the radial direction with the magnet cover 111 sandwiched therebetween.

The rotor mold portion 112 includes a covering portion 112a, a connecting portion 112b, and an impeller portion 112c.

The covering portion 112a is formed in a tubular shape extending coaxially with the axis O. The covering portion 112a integrally covers the rotor core 110, the magnets, or the magnet cover 111 through insert molding or the like. An outer circumferential portion of the magnet cover 111 is exposed from the covering portion 112a.

The connecting portion 112b extends inward from the covering portion 112a in the radial direction. The connecting portion 112b is formed in a tubular shape along the axis O. A second side end portion of the connecting portion 112b in the axial direction protrudes from the covering portion 112a in the axial direction.

The impeller portion 112c overhangs from the second side end portion of the connecting portion 112b in the axial direction toward the outer side in the radial direction. The impeller portion 112c is exposed to both of the suction channel 22a and the ejection channel 22b.

The bush 113 is integrally fixed to the connecting portion 112b inside the connecting portion 112b. The bush 113 is formed in a tubular shape disposed coaxially with the axis O. The shaft 32 passes through the bush 113. The bush 113 is rotatably supported by the shaft 32. However, the rotor 33 is rotatably supported by the shaft 32 via the bush 113.

The control board 34 is disposed in the pump cover 21 on the first side in the axial direction with respect to the stator main body 41. The control board 34 is configured by mounting a plurality of electronic parts 34b on front and back surfaces of a board main body 34a. The control board 34 is superimposed with the stator main body 41 while the thickness direction of the board main body 34a is along the axial direction. Specifically, the control board 34 is fastened to the spacer portion 103 by a screw or the like in a state in which the board main body 34a is supported by the spacer portion 103 from the second side in the axial direction. The board connecting portion 91c of the terminal 91 and the base end portions of the connector pins 45a are connected to the board main body 34a. The board connecting portion 91c and the connector pins 45a are mounted on the board main body 34a while passing through the board main body 34a.

In the EWP 1 of the embodiment, current is supplied from an external power supply to the control board 34 via the connector pins 45a of the connector tray 45. The current supplied to the control board 34 is supplied to the coil 42 of each phase via the terminal 91 at a predetermined timing according to an operation of the electronic parts 34b. A magnetic field is formed on the stator core 51 by supplying current to the coil 42, and a magnetic attractive force or repulsive force is generated between the magnets of the rotor 33 and the stator core 51. Accordingly, the rotor 33 rotates with respect to the stator 31.

When the rotor 33 is rotated, a centrifugal force is applied to cooling water flowing into the suction channel 22a by the impeller portion 112c. The cooling water is sent to a downstream side through the ejection channel 22b by the centrifugal force.

Here, In the stator 31 of the embodiment, the terminal unit 43 disposed on the first side in the axial direction with respect to the stator main body 41 is configured to include the base 93 extending in an arc shape following the stator main body 41 in the circumferential direction, the first inner side engaging portion 95 provided on the inner circumferential edge of the base 93, the outer side engaging portion 98 provided on the outer circumferential edge of the base 93, and the arm 97 extending from the outer circumferential edge of the base 93 in the radial direction and continuous with the outer side engaging portion 98.

According to the configuration, since the base 93 is formed in an arc shape, for example, in comparison with the case in which the base 93 is formed in an annular shape following the stator main body 41, a dimension of the terminal block 90 in the circumferential direction can be reduced. Moreover, since the base 93 and the outer side engaging portion 98 are connected to each other via the arm 97, in comparison with the case in which the base 93 and the outer side engaging portion 98 are directly connected to each other, a dimension of the base 93 in the radial direction can be reduced. Accordingly, reduction in size of the terminal unit 43 is achieved, and reduction in size of the stator 31 is easily realized. A material used for the terminal block 90 can be reduced, and reduction in manufacturing costs can be achieved.

In the stator 31 of the embodiment, the terminal block 90 is configured to include the first inner side engaging portion 95 engaged with the first inner side engaged portions 68 in the axial direction and the circumferential direction, and the second inner side engaging portion 96 arranged with the first inner side engaging portion 95 in the circumferential direction and engaged with the second inner side engaged portions 69 in the radial direction.

According to the configuration, when the first inner side engaging portion 95 and the second inner side engaging portion 96 are arranged in the circumferential direction, positioning of the stator main body 41 and the terminal block 90 in the radial direction on the same circumference as the first inner side engaging portion 95 can be performed. Accordingly, a protrusion amount of the terminal block 90 or the stator main body 41 (the insulator 52) inward in the radial direction can be minimized, and reduction in size of the stator 31 is easily realized.

In the stator 31 of the embodiment, the second inner side engaging portion 96 becomes an inclined surface extending outward in the radial direction from the first side toward the second side in the axial direction, and the second inner side engaged portion 69 becomes an inclined surface extending inward in the radial direction from the first side toward the second side in the axial direction.

According to the configuration, when the terminal unit 43 is assembled to the stator main body 41, the stator main body 41 and the terminal unit 43 approach each other in the axial direction. Here, when the second inner side engaged portions 69 and the second inner side engaging portion 96 slide with each other, the terminal unit 43 is guided toward the outer side in the radial direction as the stator main body 41 and the terminal unit 43 approach each other in the axial direction. Accordingly, the second inner side engaged portions 69 and the second inner side engaging portion 96 can be engaged with each other while positioning the terminal unit 43 with respect to the stator main body 41 in the radial direction. As a result, assemblability of the terminal unit 43 can be improved.

In the stator 31 of the embodiment, the first inner side engaging portion 95 is a convex portion protruding toward the second side in the axial direction with respect to the base 93, and the first inner side engaged portion 68 is a concave portion into which the first inner side engaging portion 95 is fitted. The outer side engaging portion 98 is a convex portion protruding toward the second side in the axial direction with respect to the base 93, and the outer side engaged portion 75 is a concave portion into which the outer side engaging portion 98 is fitted. According to the configuration, since the engaged portions 68 and 75 are the concave portions, an increase in dimension of the stator main body 41 in the axial direction can be minimized. Accordingly, a trajectory of a nozzle of a winding machine when a coil conductive wire is wound on the teeth 56 can be reduced. For this reason, manufacturing efficiency of the stator 31 can be improved.

In the stator 31 of the embodiment, the arm 97 extends from the base 93 in the radial direction and is connected to the outer side engaging portion 98.

According to the configuration, since the base 93 can be disposed closer to the inner side in the radial direction with respect to the outer circumferential edge of the stator main body 41, the exterior of the base 93 is easily reduced. For this reason, a material used for the terminal block 90 can be reduced, and reduction in manufacturing costs can be achieved.

In the stator 31 of the embodiment, the stator main body 41, the coil 42 and the terminal block 90 are molded integrally with each other by a resin material.

According to the configuration, even when reduction in size of the terminal block 90 is achieved, the terminal block 90 can be fixed to the stator main body 41 at a desired position.

In the stator 31 of the embodiment, the through-holes 93c passing through the base 93 in the axial direction is formed in the base 93.

According to the configuration, when the stator main body 41, the terminal block 90, or the like, is integrally molded, the through-holes 93c can be used as distribution channels for a resin material. Accordingly, a filling error of the resin material into the molding die can be prevented, and the stator main body 41, the terminal block 90, or the like, can be covered accurately.

Since the pump part 11 of the embodiment includes the stator 31 of the above-mentioned embodiment, the pump part 11 with a small size can be provided at a low cost.

Hereinabove, while the preferred examples of the present invention have been described, the present invention is not limited to these examples. Additions, omissions, substitutions and other modifications of the configurations may be made without departing from the spirit of the present invention. The present invention is not limited to the above-mentioned description but may be limited by the scope of the accompanying claims.

For example, while the case in which the motor is employed in the pump part 11 used in the EWP 1 has been described in the above-mentioned embodiment, it is not limited to the configuration. The motor can be employed for various uses in addition to the EWP 1. The stator may not be necessarily molded. While the configuration in which the terminal block 90 is engaged with the insulator 52 has been described in the above-mentioned embodiment, it is not limited to the configuration. The terminal block 90 may be engaged with the stator core 51.

While the configuration in which the arm 97 connects the outer side engaging portion 98 and the base 93 has been described in the above-mentioned embodiment, it is not limited thereto. The arm 97 may connect the inner side engaging portion 96 and the base 93.

While the case in which the inner side engaging portion 95 and the outer side engaging portion 98 are the convex portions, and the inner side engaged portion 69 and the outer side engaged portions 75 are the concave portions has been described in the above-mentioned embodiment, it is not limited to the configuration. For example, at least one of the inner side engaging portion 95 and the outer side engaging portion 98 may be a concave portion, and an engaged portion corresponding to the concave portion of the inner engaged portion 69 and the outer side engaged portions 75 may be a convex portion.

While the configuration in which the first inner side engaging portion 95 and the second inner side engaging portion 96 are arranged in the circumferential direction has been described in the above-mentioned embodiment, it is not limited to the configuration. The second inner side engaging portion 96 may not be provided. Positioning with respect to the stator main body 41 in the axial direction, the circumferential direction and the radial direction may be performed by the first inner side engaging portion 95 only.

While the configuration in which the second inner side engaging portion 96 is engaged with the second inner side engaged portions 69 from the outer side in the radial direction has been described in the above-mentioned embodiment, it is not limited to the configuration. The second inner side engaging portion 96 may be engaged with the second inner side engaged portions 69 from an inner side in the radial direction.

Figure 10:
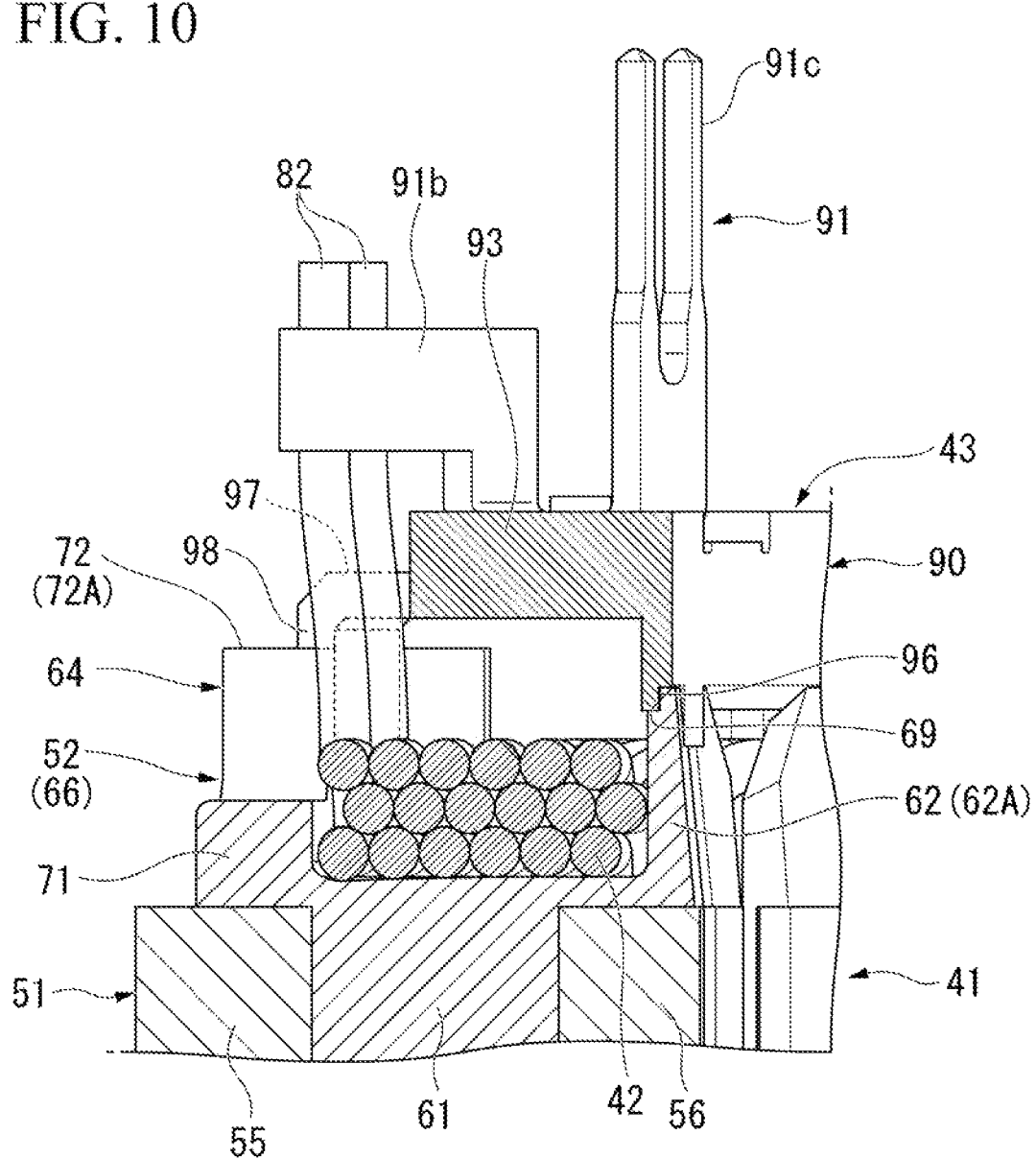
FIG. 10 is a cross-sectional view of a stator according to a variant, corresponding to FIG. 7.
Figure 11:
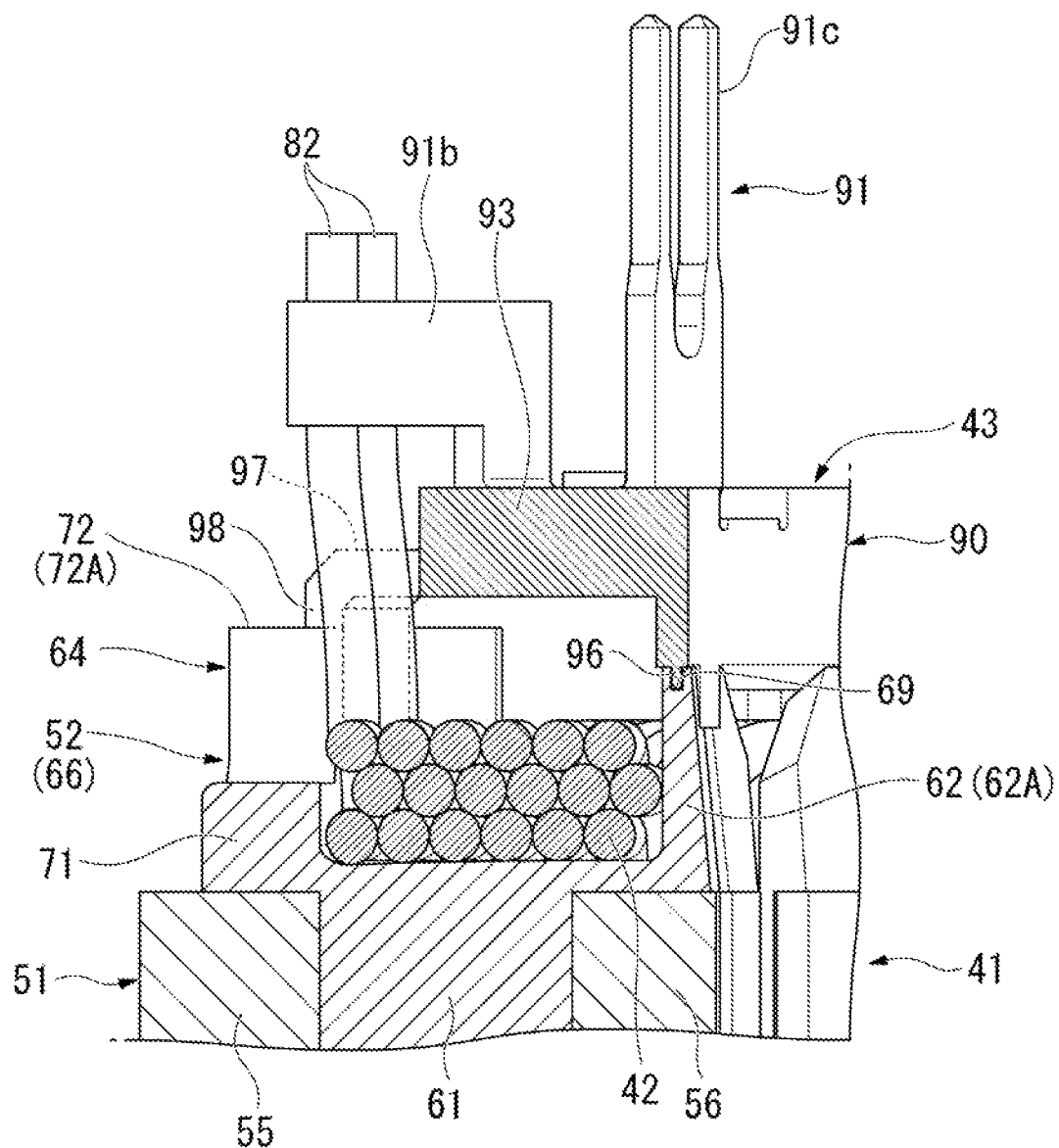
FIG. 11 is a cross-sectional view of the stator according to the variant, corresponding to FIG. 7.

While the configuration in which the second inner side engaged portions 69 and the second inner side engaging portion 96 are formed on the inclined surfaces has been described in the above-mentioned embodiment, it is not limited to the configuration. For example, as shown in FIG. 10, the engaging surfaces of the second inner side engaged portions 69 and the second inner side engaging portion 96 engaged with each other may be flat surfaces perpendicular to the radial direction. Even in this case, when the outer circumferential surface of the second inner side engaged portion 69 and the inner circumferential surface of the second inner side engaging portion 96 abut each other in the radial direction, inward movement of the terminal unit 43 in the radial direction with respect to the stator main body 41 can be restricted.

As shown in FIG. 10, the second inner side engaged portion 69 may be a concave portion that is open on only an edge of the first inner side protrusion wall 62 in the axial direction, and the second inner side engaging portion 96 may be a convex portion fitted into the first inner side protrusion wall 62. In this case, movement of the terminal unit 43 to both sides in the radial direction with respect to the stator main body 41 can be restricted.

In addition, the components in the above-mentioned embodiment may be appropriately substituted with known components and the above-mentioned variant may be appropriately combined without departing from the spirit of the present invention.

What is claimed is:

1. A stator comprising:
   a stator main body having a tubular yoke and a plurality of teeth protruding inward from the tubular yoke in a radial direction and arranged in a circumferential direction;
   a coil mounted on the teeth; and
   a terminal block disposed on a first side in the axial direction with respect to the stator main body,
   wherein the terminal block comprises:
   a base extending in an arc shape in a circumferential direction while holding a terminal to which a drawing wiring drawn from the coil is connected;
   a first inner side engaging portion provided on an inner circumferential side of the base and engaged with a first inner side engaged portion provided on an inner circumferential side of the stator main body;
   an outer side engaging portion provided on an outer circumferential side of the base and engaged with an outer side engaged portion provided on an outer circumferential side of the stator main body; and
   an arm extending in the radial direction from a part of the base in the circumferential direction and connected to an engaging portion of one of the first inner side engaging portion and the outer side engaging portion.

2. The stator according to claim 1, wherein the first inner side engaging portion is engaged with the first inner side engaged portion in the axial direction and the circumferential direction, and the terminal block includes a second inner side engaging portion provided to be arranged in the circumferential direction with respect to the first inner side engaging portion on an inner circumferential side of the base, and
   the second inner side engaging portion is engaged with a second inner side engaged portion provided on an inner circumferential side of the stator main body in the radial direction.

3. The stator according to claim 2, wherein the second inner side engaging portion has an inclined surface extending on one side in the radial direction from a first side toward a second side in the axial direction, and
   the second inner side engaged portion has an inclined surface extending on the other side in the radial direction from the first side toward the second side in the axial direction and abutting the second inner side engaging portion.

4. The stator according to claim 1, wherein the first inner side engaging portion is a convex portion protruding on a second side in the axial direction with respect to the base and the first inner side engaged portion is a concave portion into which the first inner side engaging portion is fitted,
   the outer side engaging portion is a convex portion protruding on the second side in the axial direction with respect to the base, and
   the outer side engaged portion is a concave portion into which the outer side engaging portion is fitted.

5. The stator according to claim 1, wherein the arm extends from the base toward an outer side in the radial direction and is connected to the outer side engaging portion.

6. The stator according to claim 1, wherein the stator main body, the coil and the terminal block are integrally molded by a resin material.

7. The stator according to claim 6, wherein a through-hole passing through the base in the axial direction is formed in the base.

8. A motor comprising the stator according to claim 1.

* * * * *